US012423260B2

(12) United States Patent
Luo

(10) Patent No.: US 12,423,260 B2
(45) Date of Patent: Sep. 23, 2025

(54) SEMICONDUCTOR DEVICES AND COMMUNICATION METHOD BETWEEN SEMICONDUCTOR DEVICES

(71) Applicant: Industrial Technology Research Institute, Hsinchu (TW)

(72) Inventor: Shien-Chun Luo, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 37 days.

(21) Appl. No.: 18/395,758

(22) Filed: Dec. 26, 2023

(65) Prior Publication Data

US 2025/0173300 A1    May 29, 2025

(30) Foreign Application Priority Data

Nov. 28, 2023   (TW) .................................. 112146034

(51) Int. Cl.
*G06F 13/42*    (2006.01)
(52) U.S. Cl.
CPC ...... *G06F 13/4208* (2013.01); *G06F 13/4282* (2013.01)
(58) Field of Classification Search
CPC .................... G06F 13/4208; G06F 13/4282
See application file for complete search history.

(56) References Cited

U.S. PATENT DOCUMENTS 6,067,615 A * 5/2000 Upton ................. G06F 15/7867
712/37
8,378,494 B2    2/2013 Or-Bach et al.
8,760,328 B1 *  6/2014 Koay .................... H03M 9/00
341/100

(Continued)

FOREIGN PATENT DOCUMENTS

CN    113826202    12/2021
JP    S6398899     4/1988

(Continued)

OTHER PUBLICATIONS

"Office Action of Taiwan Counterpart Application", issued on Jan. 10, 2025, p. 1-p. 5.

(Continued)

*Primary Examiner* — Henry Tsai
*Assistant Examiner* — Christopher A Daley
(74) *Attorney, Agent, or Firm* — JCIPRNET

(57) ABSTRACT

A semiconductor device and a communication method between semiconductor devices are provided. The semiconductor device includes a plurality of pins, semiconductor components and a scalable digital interface circuit. The pins are divided into a plurality of data sending groups and plurality of data receiving groups. The semiconductor components provide output data and receive input data. The scalable digital interface circuit is coupled to the data sending groups, the data receiving groups and semiconductor components, wherein the scalable digital interface circuit reorganizes the output data into parallel transmission data to send the parallel transmission data to an external semiconductor device by parallel transmission, and receives parallel reception data from the external semiconductor device by parallel transmission to reorganize the parallel reception data into the input data.

15 Claims, 8 Drawing Sheets

(56) References Cited

U.S. PATENT DOCUMENTS

| | | | |
|---|---|---|---|
| 8,922,243 | B2 | 12/2014 | Jayasena et al. |
| 9,825,843 | B2 | 11/2017 | Thottethodi et al. |
| 10,224,310 | B2 | 3/2019 | Liu |
| 10,552,357 | B2 * | 2/2020 | Wu .......................... G06F 1/10 |
| 11,194,757 | B2 | 12/2021 | Teh et al. |
| RE49,163 | E * | 8/2022 | Kaviani ................ G06F 13/362 |
| 11,478,687 | B2 * | 10/2022 | Steel, Jr. ................ A63B 60/14 |
| 11,625,351 | B2 * | 4/2023 | Hopkins ............. G06F 11/2007 |
| | | | 710/306 |
| 2008/0172510 | A1 * | 7/2008 | Chen ....................... G06F 13/36 |
| | | | 710/242 |
| 2014/0109029 | A1 * | 4/2014 | Bai ......................... G06F 30/34 |
| | | | 716/112 |
| 2015/0236870 | A1 * | 8/2015 | Lee .................... G06F 13/4068 |
| | | | 370/257 |
| 2016/0293548 | A1 * | 10/2016 | Karp .................... H03K 19/1732 |
| 2021/0288013 | A1 | 9/2021 | Subbareddy et al. |
| 2022/0180468 | A1 | 6/2022 | Matam et al. |
| 2023/0376058 | A1 | 11/2023 | Aihara et al. |

FOREIGN PATENT DOCUMENTS

| | | |
|---|---|---|
| JP | 2004139364 | 5/2004 |
| JP | 2006268814 | 10/2006 |
| JP | 2009181444 | 8/2009 |
| JP | 2009273346 | 11/2009 |
| JP | 2015035177 | 2/2015 |
| TW | I782054 | 11/2022 |

OTHER PUBLICATIONS

Thomas Benz et al., "A High-performance, Energy-efficient Modular DMA Engine Architecture", arXiv:2305.05240v2 [cs.AR], Nov. 14, 2023, pp. 1-14.

"Office Action of Japan Counterpart Application", issued on May 20, 2025, p. 1-p. 4.

* cited by examiner

SEMICONDUCTOR DEVICES AND COMMUNICATION METHOD BETWEEN SEMICONDUCTOR DEVICES

CROSS-REFERENCE TO RELATED APPLICATION

This application claims the priority benefit of Taiwan application serial no. 112146034, filed on Nov. 28, 2023. The entirety of the above-mentioned patent application is hereby incorporated by reference herein and made a part of this specification.

TECHNICAL FIELD

The disclosure relates to a semiconductor device, and to a semiconductor device using parallel transmission and a communication method between semiconductor devices.

BACKGROUND

For a long time, in order to expand the number of transistors on a chip to improve computing performance, the process of semiconductor manufacturing technology has been continuously improved. As a result, the gate length is gradually shortened, which has gradually approached the currently known physical limit. However, with the rapid development of Artificial Intelligence (AI), AI Generated Content (AIGC) and other related applications, the performance requirements of equipment for core chips will become increasingly higher. When manufacturing technology improvements may encounter bottlenecks, it has become a necessary choice to increase the number of transistors on the chip through advanced packaging technology of chip stacking. However, given that the demand for computing resources may continue to rise along with computing demands, improving chip performance under current packaging technology is still an important issue.

SUMMARY

The embodiments of the disclosure provide a semiconductor device and a communication method between semiconductor devices, which uses multiple pins to transmit data by parallel transmission to improve transmission performance and reduce transmission frequency.

One embodiment of the disclosure provides the semiconductor device, which includes a plurality of pins, at least one semiconductor components and a scalable digital interface circuit. The pins are divided into a plurality of data sending groups and plurality of data receiving groups. The at least one semiconductor components provide at least one output data and receive at least one input data. The scalable digital interface circuit is coupled to at least one of the data sending groups, at least one of the data receiving groups, and at least one semiconductor components, wherein the scalable digital interface circuit reorganizes the at least one output data into at least one parallel transmission data to send the at least one parallel transmission data to an external semiconductor device by parallel transmission, and receives at least one parallel reception data from the external semiconductor device by parallel transmission to reorganize the at least one parallel reception data into the at least one input data.

Another embodiment of the disclosure provides the communication method between semiconductor devices, which includes the following steps. At least one output data provided by at least one semiconductor components is reorganized into at least one parallel transmission data by a scalable digital interface circuit. The at least one parallel transmission data is sent to an external semiconductor device via parallel transmission by at least one of a plurality of data sending groups of a plurality of pins. At least one parallel reception data is received from the external semiconductor device by at least one of a plurality of data receiving groups of the pins. The at least one parallel reception data is reorganized into the at least one input data and is provided to the at least one semiconductor components by the scalable digital interface circuit.

Based on the above, the semiconductor device and the communication method between semiconductor devices of the embodiment of the disclosure, wherein the data is transmitted between semiconductor devices through parallel transmission, so the use of parallel transmission increases the speed of huge data transmission, and the signal frequency can be performed at low speed. In this way, the transmission performance can be improved and the transmission frequency can be reduced.

In order to make the above-mentioned features and advantages of the disclosure more obvious and easier to understand, embodiments are given below and described in detail with reference to the attached drawings.

DETAILED DESCRIPTION OF DISCLOSURED EMBODIMENTS

Figure 1:
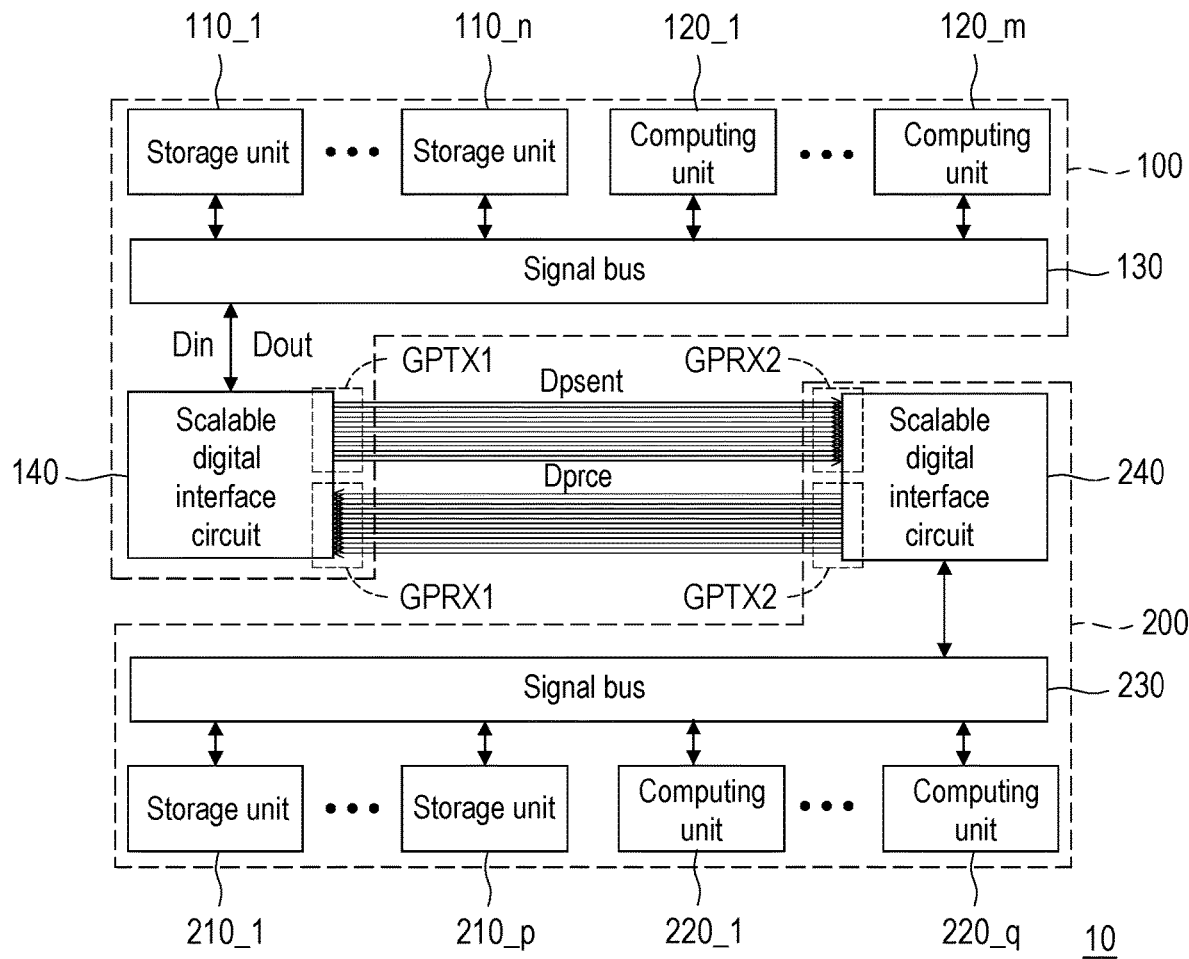
FIG. 1 is a schematic diagram of a system for packaging multiple semiconductor devices according to an embodiment of the disclosure.

FIG. 1 is a schematic diagram of a system for packaging multiple semiconductor devices according to an embodiment of the disclosure. Referring to FIG. 1, in the embodiment, the integrated circuit 10 at least includes semiconductor devices 100 and 200, wherein the semiconductor devices 100 and 200 may be, for example, chips. And the semiconductor devices 100 and 200 can be packaged as a single integrated circuit using a three-dimensional (3D) chip packaging method or a chiplet packaging method, that is, the semiconductor devices 100 and 200 can be stacked adjacently or closely in the integrated circuit in different ways, but the disclosure is not limited thereto.

In the embodiment, the semiconductor device 100 includes, for example, a plurality of pins (such as a plurality of sending pins GPTX1 and a plurality of receiving pins GPRX1), at least one semiconductor components (such as storage units 110_1~110_n and/or computing units 120_1~120_m, wherein n and m can be any positive integers, depending on the circuit design), a signal bus 130 and a scalable digital interface circuit 140. Wherein, the sending pins GPTX1 can be divided into a plurality of data sending groups (GTX1~GTX5 shown in FIG. 8), and the receiving pins GPRX1 can be divided into a plurality of data receiving groups (GRX1~GRX5 shown in FIG. 8). The scalable digital interface circuit 140 is based on the data sending groups (GTX1~GTX5 shown in FIG. 8) for data output, and based on the data receiving groups (GRX1~GRX5 shown in FIG. 8) for data input.

The signal bus 130 is coupled to the storage units 110_1~110_n, the computing units 120_1~120_m and the scalable digital interface circuit 140, that is, the scalable digital interface circuit 140 is coupled to the storage units 110_1~110_n and the computing units 120_1~120_m through the signal bus 130. And the scalable digital interface circuit 140 is coupled to at least one data sending groups (GTX1~GTX5 shown in FIG. 8) of the sending pins GPTX1, and is coupled to at least one data receiving groups (GRX1~GRX5 shown in FIG. 8) of the receiving pins GPRX1.

When at least one of the storage units 110_1~110_n and the computing units 120_1~120_m provides output data Dout, the scalable digital interface circuit 140 can receive at least one output data Dout through the signal bus 130. Then, the at least one output data Dout is reorganized into at least one parallel transmission data Dpsent to send the at least one parallel transmission data Dpsent to another external semiconductor device (such as the semiconductor device 200) through the coupled data sending groups (GTX1~GTX5 shown in FIG. 8) by parallel transmission.

When the scalable digital interface circuit 140 receives at least one parallel reception data Dprce from another external semiconductor device (such as the semiconductor device 200) through the coupled data receiving groups (GRX1~GRX5 shown in FIG. 8) by parallel transmission, the scalable digital interface circuit 140 may reorganize the at least one parallel reception data Dprce into at least one input data Din and transmit it to the signal bus 130, wherein the input data Din may correspond to the data format of the received target (that is, one of the storage units 110_1~110_n and the computing units 120_1~120_m). Then, one or more of the storage units 110_1~110_n and the computing units 120_1~120_m receives a corresponding one of the at least one input data Din through the signal bus 130.

Based on the above, in 3D chip packaging or chiplet packaging, chips are stacked adjacently or closely, so a large number of channels (such as through-silicon via (TSV) or Redistribution Layer (RDL)) can be established between the semiconductor devices 100 and 200. The data transmission speed (such as bandwidth) can be increased through a large number of channels, and the signal frequency does not necessarily need to be performed at high speed. In this way, transmission performance can be improved while reducing power consumption and cost, and the transmission frequency can be reduced. Moreover, through the scalable digital interface circuits 140 and 240, signals are transmitted between the semiconductor devices 100 and 200 through digital connections, so the manufacturing processes of the semiconductor components can be freely switched.

In the embodiment, the semiconductor device 200 includes, for example, a plurality of pins (such as a plurality of sending pins GPTX2 and a plurality of receiving pins GPRX2), at least one semiconductor components (such as storage units 210_1~210_p and/or computing units 220_1~220_q, wherein p and q can be any positive integers or 0, depending on the circuit design), a signal bus 230 and a scalable digital interface circuit 240, wherein the coupling structure and operation mode of the semiconductor device 200 may refer to the description of the semiconductor device 100, and will not be described again here.

In the embodiment, the storage units 110_1~110_n and/or the computing units 120_1~120_m can be integrated into at least one crystal grain. For example, the storage units 110_1~110_n can be integrated into one or more crystal grains, and the computing units 120_1~120_m can be integrated into one or more crystal grains, depending on the circuit design, and the embodiment of the disclosure is not limited thereto. Likewise, the storage units 210_1~210_p and/or the computing units 220_1~220_q can be integrated into at least one crystal grain.

In the embodiment, in response to the circuit design of the storage units 110_1~110_n and/or the computing units 120_1~120_m, each of the output data Dout and the input data Din may include, for example, at least one of an Advanced High-performance Bus (AHB) signal, an Advanced extensible Interface (AXI) signal, a serial bus signal, and a parallel bus signal.

In the embodiment, the computing units 120_1~120_m and 220_1~220_q includes, for example, at least one of a central processing unit (CPU), an application processor (AP) and a graphic processing unit (GPU).

In the embodiment, the storage units 110_1~110_n and 210_1~210_p may include a dynamic random access memory (DRAM) device, a static random access memory (SRAM) device, a thyristor random access memory (TRAM) device, an anti-NAND flash memory device, an anti-NAND flash memory device, a resistive random access memory (RRAM) device, a ferroelectric random access memory (FRAM) device, a phase change random access memory (PRAM) device, a magnetic random access memory (MRAM) device, a solid state drive (SSD), a memory card, an universal flash memory device (UFS) or similar device.

Figure 2:
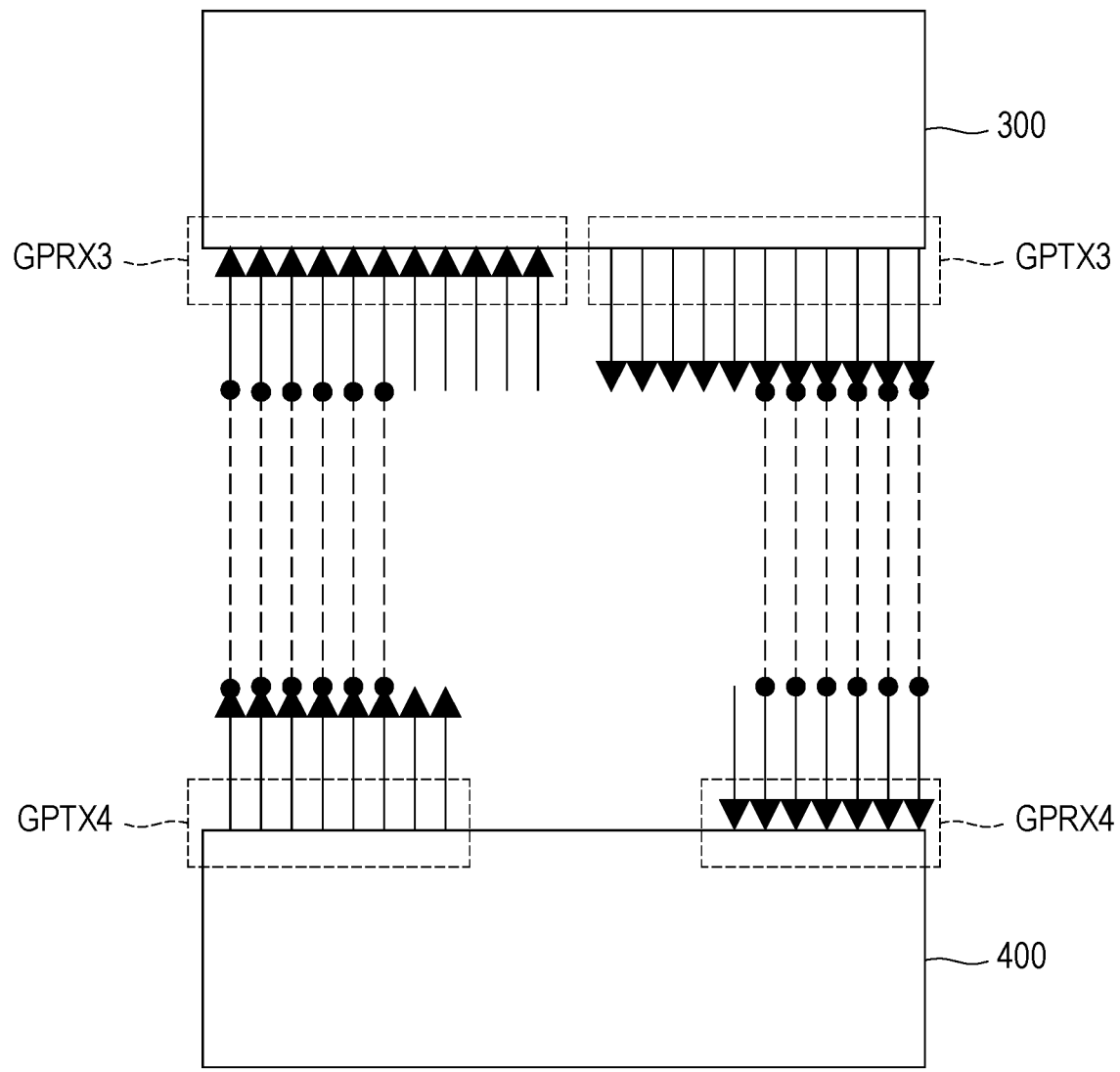
FIG. 2 is a coupling schematic diagram of pins connecting between the semiconductor devices according to an embodiment of the disclosure.

FIG. 2 is a coupling schematic diagram of pins connecting between the semiconductor devices according to an embodiment of the disclosure. Referring to FIG. 1 and FIG. 2, in the embodiment, the semiconductor devices 300 and 400 may be shown with reference to the embodiments of the semiconductor devices 100 and 200. In the embodiment, the number of the sending pins GPTX3 of the semiconductor device 300 may be different from the number of the receiving pins GPRX4 of the semiconductor device 400, and the number of the receiving pins GPRX3 of the semiconductor device 300 may be different from the number of the sending pins GPTX4 of the semiconductor device 400. However, the sending pins GPTX3 of the semiconductor device 300 and the receiving pins GPRX4 of the semiconductor device 400 can be grouped into multiple data sending groups and multiple data receiving groups based on the same pin base number (such as 40 pins), so that the data sending groups of the semiconductor device 300 and the data receiving groups of the semiconductor device 400 can be coupled in a group-to-group manner. Thereby, the semiconductor device 300 and the semiconductor device 400 can send data from the semiconductor device 300 to the semiconductor device 400 through the coupled data sending groups and data receiving groups.

In the embodiment, the connection number of the sending pins GPTX3 of the semiconductor device 300 and the receiving pins GPRX4 of the semiconductor device 400 is in units of a pin base number (such as 40 pins) of a single data sending group/single data receiving group and is less than or equal to the smaller of the number of the sending pins GPTX3 of the semiconductor device 300 and the number of the receiving pins GPRX4 of the semiconductor device 40. For example, the connection number between the sending pins GPTX3 (such as 640 pins) of the semiconductor device 300 and the receiving pins GPRX4 (such as 560 pins) of the semiconductor device 400 can be 14 pairs of data sending groups-data receiving groups (that is, 14*40=560 pins).

Based on the above, through digital connections, the semiconductor devices 300 and 400 can be connected without defining the same number of pins, that is, the semiconductor devices with different numbers of pins are allowed to be connected, thereby improving the flexibility of semiconductor device connection.

In the embodiment, when the sending speed of the sending pins GPTX3 of the semiconductor device 300 is higher than the transmission speed of the receiving pins GPRX4 of the semiconductor device 400, the usage ratio of the connecting portion of the sending pins GPTX3 of the semiconductor device 300 and the receiving pins GPRX4 of the semiconductor device 400 can be increased to avoid delays in signal transmission; relatively speaking, when the sending speed of the sending pins GPTX3 of the semiconductor device 300 is less than the transmission speed of the receiving pins GPRX4 of the semiconductor device 400, the usage ratio of the connecting portion of the sending pins GPTX3 of the semiconductor device 300 and the receiving pins GPRX4 of the semiconductor device 400 can be decreased to reduce the waste of system performance without affecting signal transmission.

In the embodiment, when the transmission speed of the output data Dout and the input data Din increases, the usage ratio of the connecting portion of the sending pins GPTX3 of the semiconductor device 300 and the receiving pins GPRX4 of the semiconductor device 400 can be increased to reduce the idle rate (or idle time) of the scalable digital interface circuit (such as the scalable digital interface circuits 140, 240) or the time that signals to be sent are accumulated in the scalable digital interface circuit (such as the scalable digital interface circuits 140, 240); relatively speaking, when the transmission speed of the output data Dout and the input data Din decreases, the usage ratio of the connecting portion of the sending pins GPTX3 of the semiconductor device 300 and the receiving pins GPRX4 of the semiconductor device 400 can be decreased.

Figure 3:
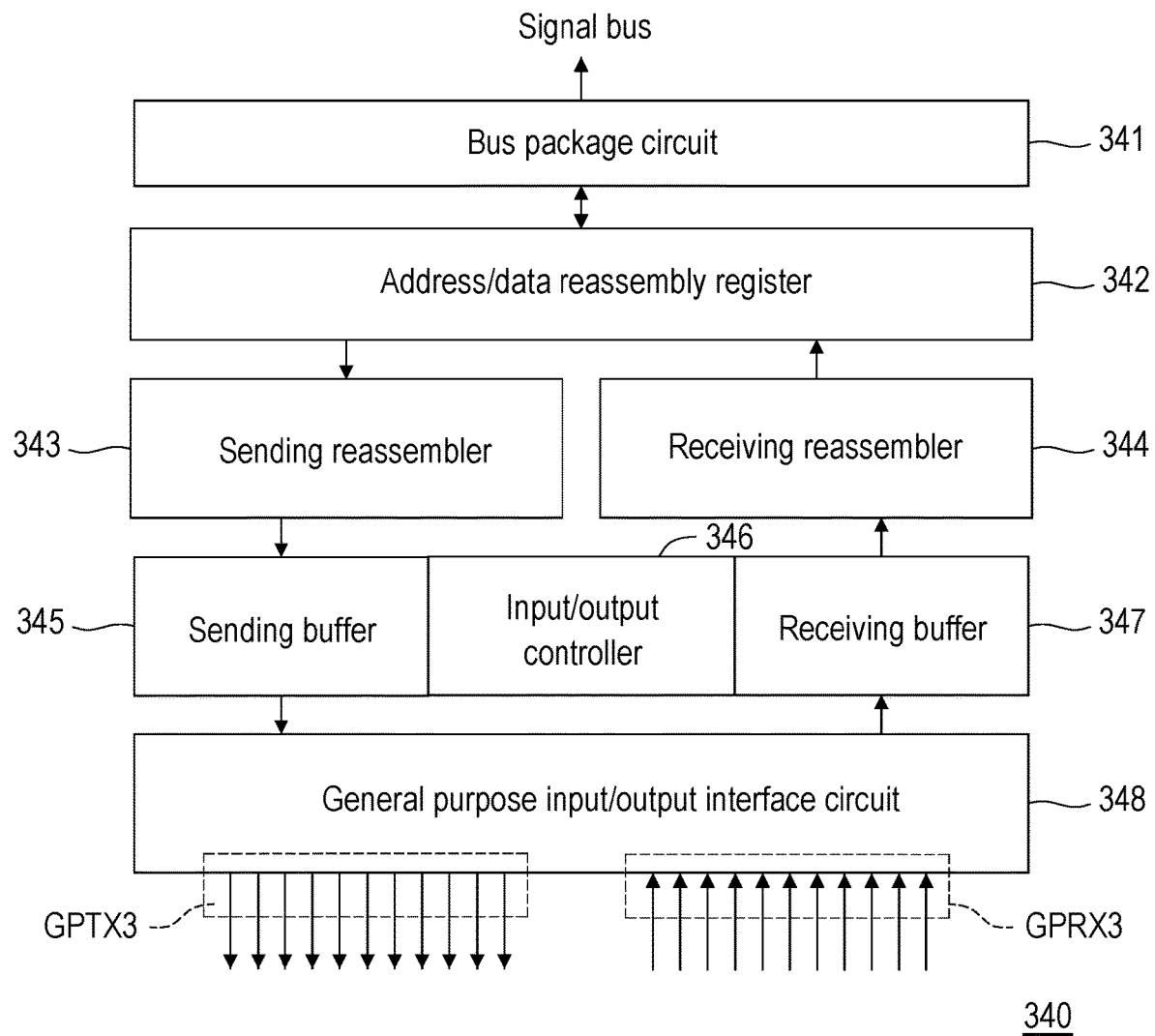
FIG. 3 is a system schematic diagram of a scalable digital interface circuit according to an embodiment of the disclosure.

FIG. 3 is a system schematic diagram of a scalable digital interface circuit according to an embodiment of the disclosure. Referring to FIG. 1 to FIG. 3, in the embodiment, the semiconductor device 300 includes, for example, a scalable digital interface circuit 340, wherein the scalable digital interface circuits 140 and 240 can refer to the scalable digital interface circuit 340. Moreover, the scalable digital interface circuit 340 includes a bus package circuit 341, an address/data reassembly register 342, a sending reassembler 343, a receiving reassembler 344, a sending buffer 345, an input/output controller 346, a receiving buffer 347 and a general-purpose input/output interface circuit 348.

The bus package circuit 341 is coupled to the signal bus 130, the address/data reassembly register 342 is coupled to the bus package circuit 341. The sending reassembler 343 is coupled to the address/data reassembly register 342. The receiving reassembler 344 is coupled to the address/data reassembly register 342. The sending buffer 345 is coupled to the sending reassembler 343. The receiving buffer 347 is coupled to the receiving reassembler 344. The general-purpose input/output interface circuit 348 is coupled to the sending buffer 345 and the receiving buffer 347. The input/output controller 346 is coupled to the sending buffer 345 and the receiving buffer 347.

The input/output controller 346 is used to control the sending buffer 345 and the receiving buffer 347. Wherein, when the bus package circuit 341 receives the output data (such as the output data Dout) from the storage unit (such as the storage units 110_1~110_$n$, 210_1~210_$p$) and/or the computing unit (such as the computing units 120_1~120_$m$, 220_1~220_$q$) via the signal bus (such as the signal bus 130, 230), the bus package circuit 341 temporarily stores the output data (such as the output data Dout) in the address/data reassembly register 342. Then, the sending reassembler 343 reorganizes the output data (such as the output data Dout) into the parallel transmission data (such as the parallel transmission data Dpsent) to temporarily store in the sending buffer 345, wherein the sending reassembler 343 is responsible for organizing the execution sequence of read and write instructions into a small packet of continuous data to provide the parallel transmission data (such as the parallel transmission data Dpsent). Moreover, the general-purpose input/output interface circuit 348 sends the parallel transmission data (such as the parallel transmission data Dpsent) temporarily stored in the sending buffer 345 to another external semiconductor device (such as the semiconductor device 400) via at least one of the data sending groups of the sending pins GPTX3.

On the other hand, when the general-purpose input/output interface circuit 348 receives the parallel reception data (such as the parallel reception data Dprce) from another external semiconductor device (such as the semiconductor device 400) via at least one of the data receiving groups of the receiving pins GPRX3, the general-purpose input/output interface circuit 348 temporarily stores the parallel reception data (such as the parallel reception data Dprce) in the receiving buffer 347. Then, the receiving reassembler 344 reorganizes the parallel reception data (such as the parallel reception data Dprce) temporarily stored in the receiving buffer 347 into the input data (such as the input data Din) and temporarily stores in the address/data reassembly register 342, wherein the receiving reassembler 344 is responsible for restoring a small packet of data (that is, the parallel reception data Dprce) into a randomly writable execution sequence to provide the input data (such as the input data Din). Moreover, the bus package circuit 341 provides the input data (such as the input data Din) temporarily stored in the address/data reassembly register 342 via the signal bus (such as the signal bus 130, 230) to the storage unit (such as the storage units 110_1~110_$n$, 210_1~210_$p$) and/or the computing unit (such as the computing units 120_1~120_$m$, 220_1~220_$q$).

Figure 4:
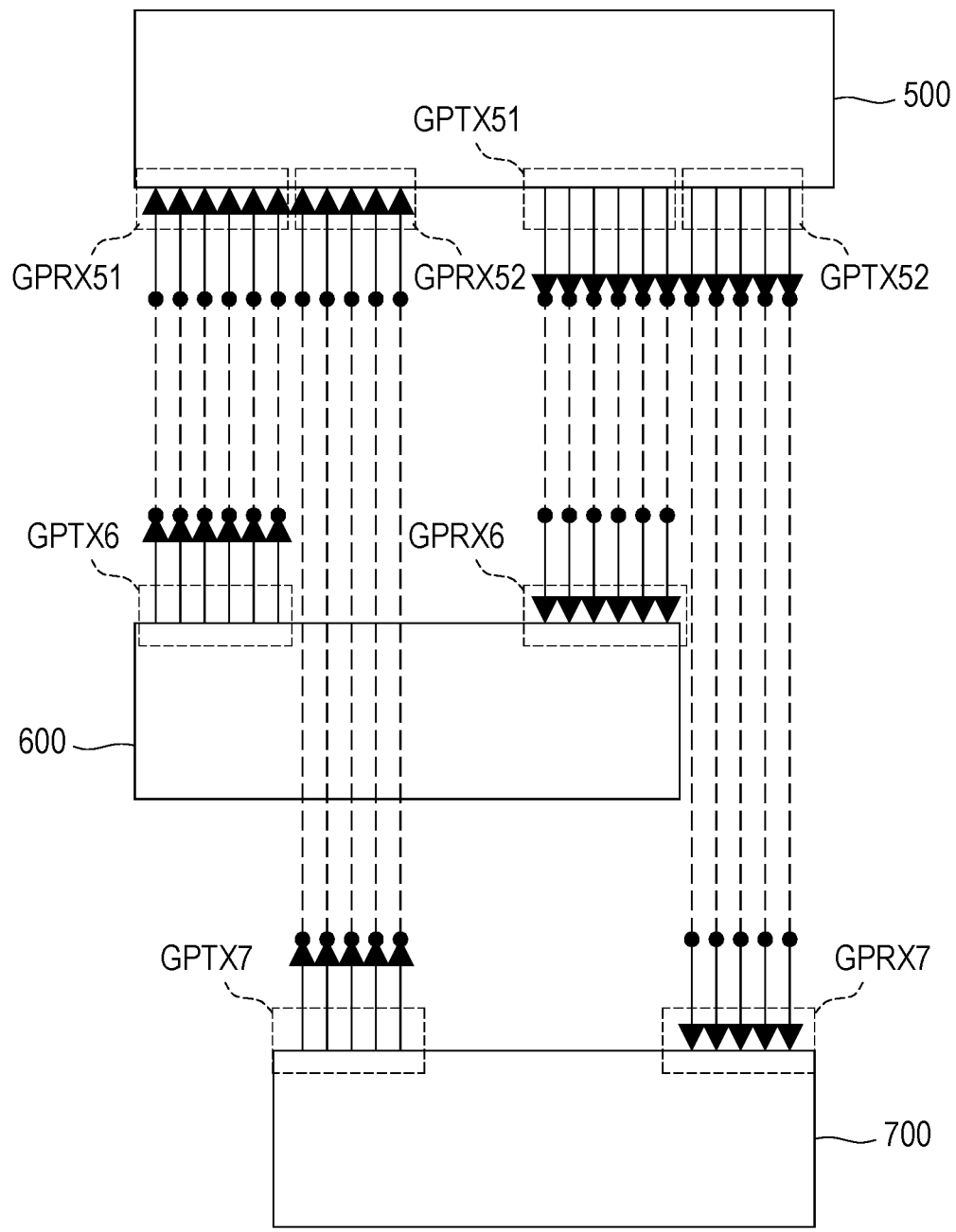
FIG. 4 is a coupling schematic diagram of pins connecting between the semiconductor devices according to another embodiment of the disclosure.

FIG. 4 is a coupling schematic diagram of pins connecting between the semiconductor devices according to another embodiment of the disclosure. Referring to FIG. 1, FIG. 2 and FIG. 4, in the embodiment, the semiconductor devices 500, 600 and 700 can refer to the embodiments of the semiconductor devices 100 and 200. In the embodiment, the sending pins GPTX51 and GPTX52 of the semiconductor device 500 can be divided into a plurality of data sending groups, and the receiving pins GPRX51 and GPRX52 of the semiconductor device 500 can be divided into a plurality of data receiving groups. Likewise, the sending pin GPTX6 of the semiconductor device 600 and the sending pin GPTX7 of the semiconductor device 700 can be divided into a plurality of data sending groups, and the receiving pin GPRX6 of the semiconductor device 600 and the receiving pin GPRX7 of the semiconductor device 700 can be divided into a plurality of data receiving groups.

In the embodiment, the data sending group of the sending pin GPTX51 of the semiconductor device 500 and the data receiving group of the receiving pin GPRX6 of the semiconductor device 600 can be coupled in a group-to-group manner. The data sending group of the sending pin GPTX52 of the semiconductor device 500 and the data receiving group of the receiving pin GPRX7 of the semiconductor device 700 can be coupled in a group-to-group manner. The data receiving group of the receiving pin GPRX51 of the semiconductor device 500 and the data sending group of the sending pin GPTX6 of the semiconductor device 600 can be coupled in a group-to-group manner. And the data receiving group of the receiving pin GPRX52 of the semiconductor device 500 and the data sending group of the sending pin GPTX7 of the semiconductor device 700 can be coupled in a group-to-group manner.

The ratio of the receiving pins GPRX51 and GPRX52 of the semiconductor device 500 may be related to the ratio of the transmission speed of the sending pin GPTX6 of the semiconductor device 600 to the transmission speed of the sending pin GPTX7 of the semiconductor device 700, or related to the ratio of the transmission speed of the output data (such the output data Dout) and/or the input data (such as the input data Din) inside the semiconductor device 600 to the transmission speed of the output data (such the output data Dout) and/or the input data (such as the input data Din) inside the semiconductor device 700, that is, the higher the transmission speed, the higher the proportion.

On the other hand, the ratio of the sending pins GPTX51 and GPTX52 of the semiconductor device 500 may be related to the ratio of the transmission speed of the receiving pin GPRX6 of the semiconductor device 600 to the transmission speed of the receiving pin GPRX7 of the semiconductor device 700, that is, the lower the transmission speed, the higher the proportion; or related to the ratio of the transmission speed of the output data (such the output data Dout) and/or the input data (such as the input data Din) inside the semiconductor device 600 to the transmission speed of the output data (such the output data Dout) and/or the input data (such as the input data Din) inside the semiconductor device 700, that is, the higher the transmission speed, the higher the proportion.

Figure 5:
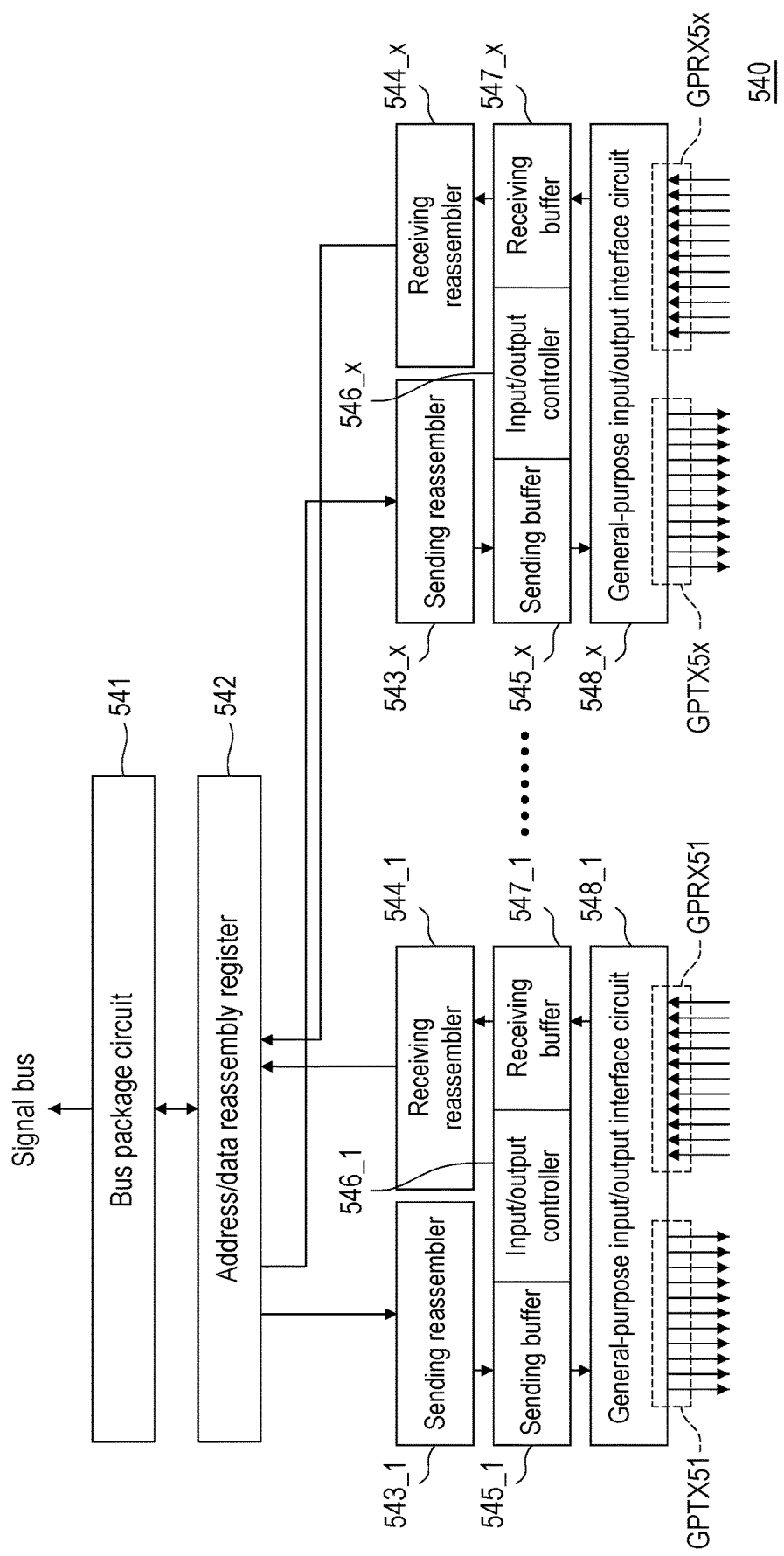
FIG. 5 is a system schematic diagram of a scalable digital interface circuit according to another embodiment of the disclosure.

FIG. 5 is a system schematic diagram of a scalable digital interface circuit according to another embodiment of the disclosure. Referring to FIG. 1 to FIG. 5, in the embodiment, the semiconductor device 500 includes, for example, a scalable digital interface circuit 540, wherein the scalable digital interface circuits 140 and 240 can refer to the scalable digital interface circuit 540. Moreover, the scalable digital interface circuit 540 includes a bus package circuit 541, an address/data reassembly register 542, sending reassemblers 543_1~543_$x$, receiving reassemblers 544_1~544_$x$, sending buffers 545_1~545_$x$, input/output controllers 546_1~546_$x$, receiving buffers 547_1~547_$x$ and general-purpose input/output interface circuits 548_1~548_$x$, wherein $x$ can be any positive integer. And the operation of the scalable digital interface circuit 540 can be referred to the scalable digital interface circuit 340 and will not be described again here. In addition, due to the large number of connections required for parallel transmission, the semiconductor devices (such as the semiconductor devices 500~600) do not span too long distances, so usually $x<4$. However, when long-distance transmission is required, other connection protocols may be adopted, such as Peripheral Component Interconnect Express (PCIE), Universal Chip Interconnect Interface (UCIE), etc., and the embodiment of the disclosure is not limited thereto.

Figure 6:
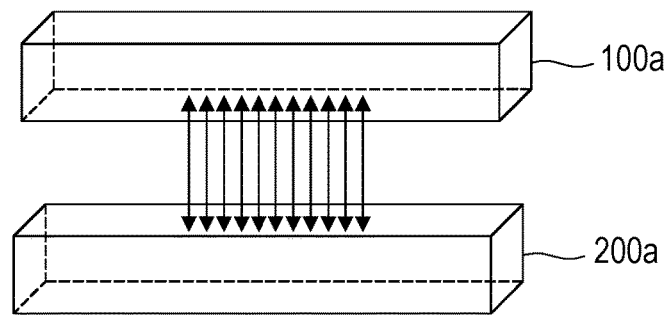
FIG. 6 is a stacking diagram of a semiconductor device according to an embodiment of the disclosure.

FIG. 6 is a stacking diagram of a semiconductor device according to an embodiment of the disclosure. Referring to FIG. 1 and FIG. 6, in the embodiment, the semiconductor devices 100*a* and 200*a* are directly stacked, that is, the semiconductor devices 100*a* and 200*a* are packaged using a 3D chip packaging method.

Figure 7:
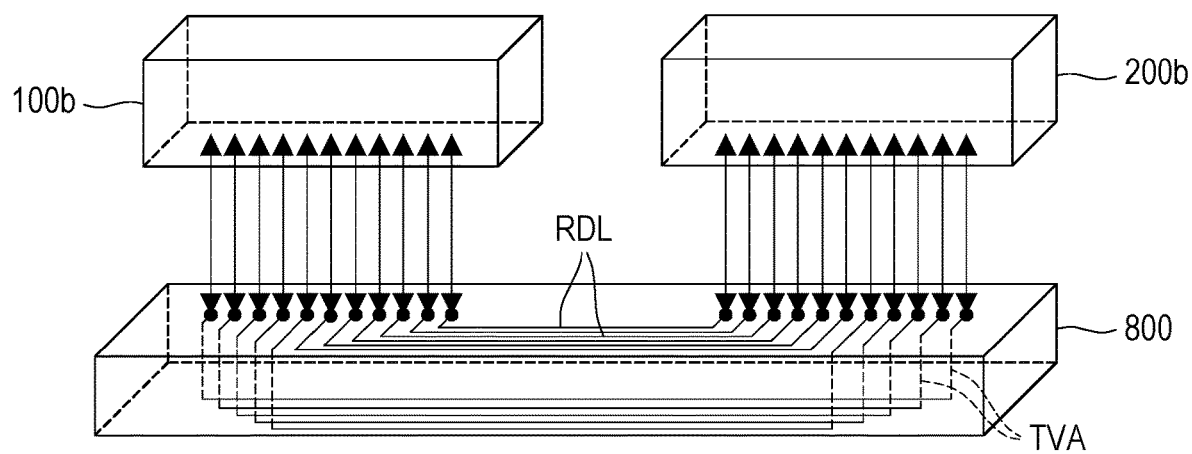
FIG. 7 is a stacking diagram of a semiconductor device according to another embodiment of the disclosure.

FIG. 7 is a stacking diagram of a semiconductor device according to another embodiment of the disclosure. Referring to FIG. 1 and FIG. 7, in the embodiment, are adjacently stacked on the same surface on an interposer or a substrate 800, that is, the semiconductor devices 100*b* and 200*b* are packaged using a chiplet packaging method. Wherein, the semiconductor devices 100*b* and 200*b* are coupled to each other through the path formed by the redistribution layer (RDL) and/or through-silicon via (TVA) on the interposer or the substrate 800.

Figure 8:
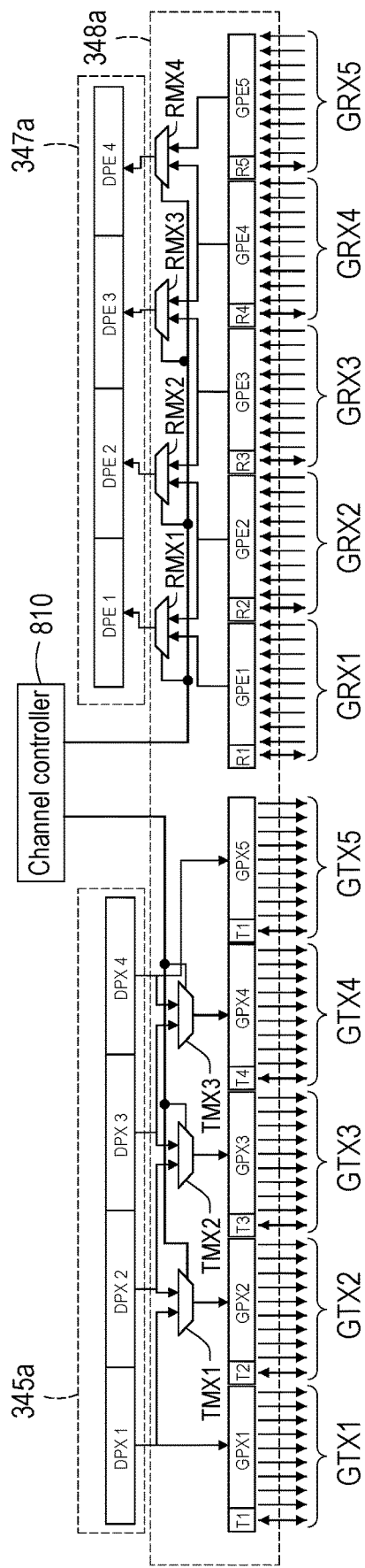
FIG. 8 is a circuit schematic diagram of a general-purpose input/output interface circuit according to an embodiment of the disclosure.

FIG. 8 is a circuit schematic diagram of a general-purpose input/output interface circuit according to an embodiment of the disclosure. Referring to FIG. 1, FIG. 3 and FIG. 8, in the embodiment, the general-purpose input/output interface circuit 348 can refer to the general-purpose input/output interface circuit 348*a*, wherein the general-purpose input/output interface circuit 348*a* includes a plurality of general-purpose input/output transmission circuits GPX1~GPX5, a plurality of general-purpose input/output reception circuits GPE1~GPE5, a plurality of transmission multiplexers TMX1~TMX3 and a plurality of reception multiplexers RMX1~RMX4.

In the embodiment, it is assumed that the parallel transmission data (such as the parallel transmission data Dpsent) stored in the sending buffer 345*a* has 4 transmission data parts DPX1~DPX4, and the received parallel reception data (such as the parallel reception data Dprce) has 4 reception data parts DPE1~DPE4 and is stored in the receiving buffer 347*a*. At this time, the general-purpose input/output interface circuit 348*a* can selectively utilize the general-purpose input/output transmission circuits GPX1~GPX5 to send the parallel transmission data (such as the parallel transmission data Dpsent), and the general-purpose input/output interface circuit 348*a* can selectively utilize the general-purpose input/output reception circuits GPE1~GPE5 to receive the parallel reception data (such as the parallel reception data Dprce).

In the embodiment, the transmission multiplexers TMX1~TMX3 individually has a first input end receiving one of the transmission data parts DPX1~DPX4 (corresponding to a first transmission data part) from the sending buffer 345*a*, a second input end receiving another one of the transmission data parts DPX1~DPX4 (corresponding to a second transmission data part) adjacent to the first transmission data part from the sending buffer 345*a*, and an output end coupled to one of the general-purpose input/output transmission circuits GPX1~GPX5.

Furthermore, the transmission multiplexer TMX1 receives the transmission data parts DPX1 and DPX2 and is coupled to the general-purpose input/output transmission circuit GPX2. The transmission multiplexer TMX2 receives the transmission data parts DPX2 and DPX3 and is coupled to the general-purpose input/output transmission circuit GPX3. The transmission multiplexer TMX3 receives the transmission data parts DPX3 and DPX4 and is coupled to the general-purpose input/output transmission circuit GPX4. Wherein, the general-purpose input/output transmission circuit GPX1 directly receives the transmission data part DPX1, and the general-purpose input/output transmission circuit GPX5 directly receives the transmission data part DPX5. Based on above, the general-purpose input/output transmission circuits GPX1~GPX5 are individually used to receive one of the transmission data parts DPX1~DPX4, and allocate data via the transmission multiplexers TMX1~TMX3.

The reception multiplexers RMX1~RMX4 individually has a first input end coupled to one of the general-purpose input/output reception circuits GPE1~GPE5 (corresponding to a first general-purpose input/output reception circuit), a second input end coupled to another one of the general-purpose input/output reception circuits GPE1~GPE5 (corresponding to a second general-purpose input/output reception circuit) adjacent to the first general-purpose input/output reception circuit, and an output end providing one of the reception data parts DPE1~DPE4.

Furthermore, the reception multiplexer RMX1 is coupled to the general-purpose input/output reception circuits GPE1 and GPE2 and provides the reception data part DPE1. The reception multiplexer RMX2 is coupled to the general-purpose input/output reception circuits GPE2 and GPE3 and provides the reception data part DPE2. The reception multiplexer RMX3 is coupled to the general-purpose input/output reception circuits GPE3 and GPE4 and provides the reception data part DPE3. The reception multiplexer RMX4 is coupled to the general-purpose input/output reception circuits GPE4 and GPE5 and provides the reception data part DPE4. Based on above, the general-purpose input/output reception circuits GPE1~GPE5 are individually used to receive one of the reception data parts DPE1~DPE4, and allocate data via the reception multiplexers RMX1~RMX4.

Based on the above, when one of the general-purpose input/output transmission circuits GPX1~GPX5 has a fault or error, data can be sent through other general-purpose input/output transmission circuits. And when one of the general-purpose input/output reception circuits GPE1~GPE5 has a fault or error, data can be received through other general-purpose input/output reception circuits.

In the embodiment, the general-purpose input/output interface circuit 348a further includes a plurality of transmitting synchronization circuits T1~T5 and a plurality of receiving synchronization circuits R1~R5. One of the general-purpose input/output transmission circuits GPX1~GPX5 and one of the transmitting synchronization circuits T1~T5 are grouped as pins coupled to the same data sending group (such as the data sending groups GTX1~GTX5). For example, the general-purpose input/output transmission circuit GPX1 and the transmitting synchronization circuit T1 are grouped as pins coupled to the data sending group GTX1, and the general-purpose input/output transmission circuit GPX2 and the transmitting synchronization circuit T2 are grouped as pins coupled to the data sending group GTX2. The rest can be deduced in this way and can be shown in the drawings, so they will not be described again here.

One of the general-purpose input/output reception circuits GPE1~GPE5 and one of the receiving synchronization circuits R1~R5 are grouped as pins coupled to the same data receiving group (such as the data receiving groups GRX1~GRX5). For example, the general-purpose input/output reception circuit GPE1 and the receiving synchronization circuit R1 are grouped as pins coupled to the data receiving group GRX1, and the general-purpose input/output reception circuit GPE2 and the receiving synchronization circuit R2 are grouped as pins coupled to the data receiving group GRX2. The rest can be deduced in this way and can be shown in the drawings, so they will not be described again here.

The transmitting synchronization circuits T1~T5 are used to send a sending synchronization signal (usually a clock signal or data ready signal) and receive a receiving synchronization signal (usually a clock signal or data ready signal of the receiving end). The receiving synchronization circuits R1~R5 are used to receive the sending synchronization signal (usually a clock signal or data ready signal of the transmitting end) and send the receiving synchronization signal (usually a clock signal or data ready signal).

In the embodiment of the disclosure, the semiconductor device (such as the semiconductor device 100) further includes a channel controller 810. The channel controller 810 is coupled to the transmission multiplexers TMX1~TMX3 and the reception multiplexers RMX1~RMX4 to control the output end of each transmission multiplexers TMX1~TMX3 to be coupled to one of the first input end and the second input end, and to control the output end of each transmission multiplexers RMX1~RMX4 to be coupled to one of the first input end and the second input end based on a channel test. Furthermore, the channel controller 810 may first test the channel (that is, between the connected pins/between the data sending group and the data receiving group) before starting communication, that is, testing whether the channel is valid by sending and receiving data. If all channels are valid, data may be sent and received through the preset channels. If there are invalid channels and the fault tolerance is not exceeded, data may be sent and received through the valid channels. Moreover, after communication, the channel controller 810 can perform data/channel handshake through the transmitting synchronization circuit (such as the transmitting synchronization circuits T1~T5) and the receiving synchronization circuit (such as the receiving synchronization circuits R1~R5).

In the embodiment of the disclosure, the channel controller 810 can be configured in the input/output controller 346, and the channel controller 810 between various semiconductor devices (such as the semiconductor devices 100~700) can be communicatively connected to each other to perform channel testing.

Figure 9:
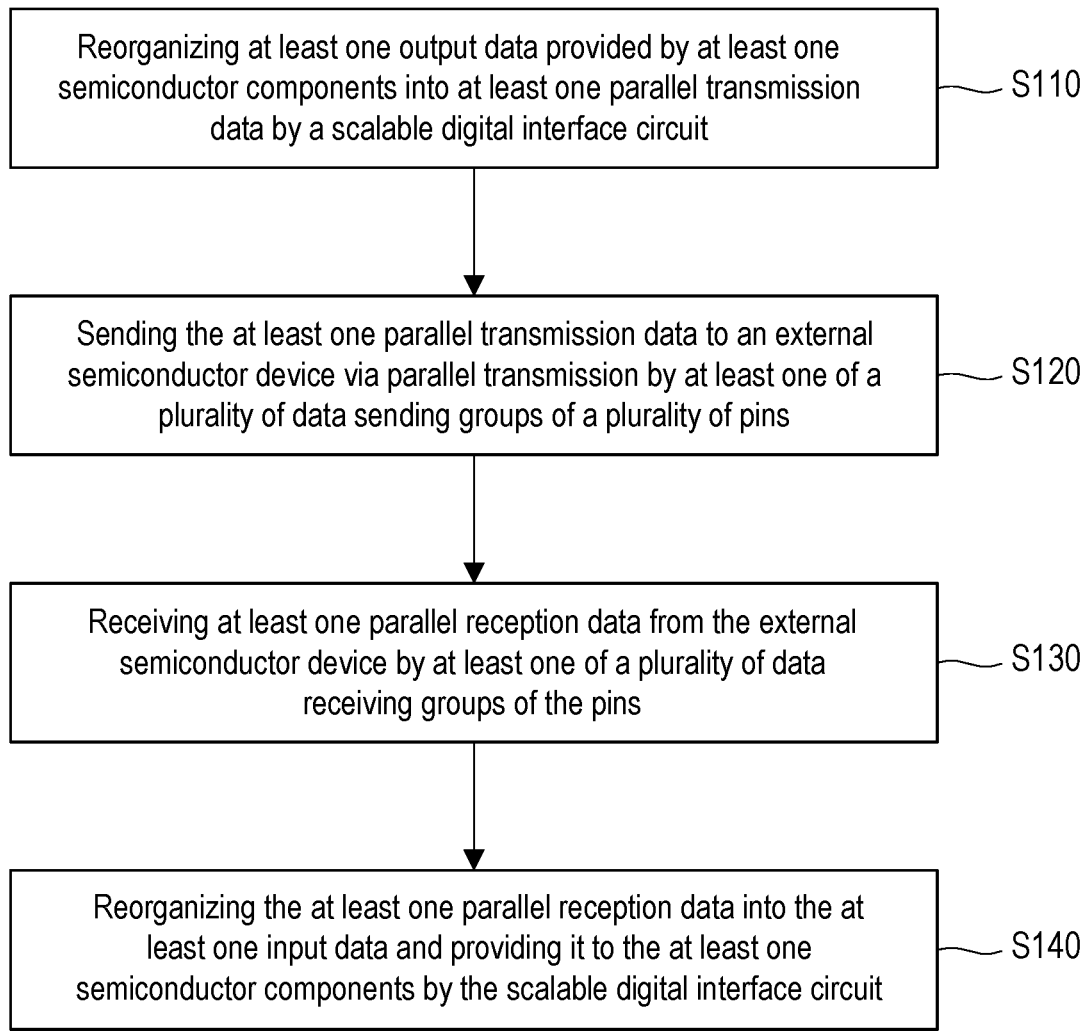
FIG. 9 is a flow chart of a communication method of multiple semiconductor devices according to an embodiment of the disclosure.

FIG. 9 is a flow chart of a communication method of multiple semiconductor devices according to an embodiment of the disclosure. Referring to FIG. 9, in the embodiment, the communication method of the semiconductor devices includes the following steps. In step S110, at least one output data provided by at least one semiconductor components is reorganized into at least one parallel transmission data by a scalable digital interface circuit. In step S120, the at least one parallel transmission data is sent to an external semiconductor device via parallel transmission by at least one of a plurality of data sending groups of a plurality of pins. In step S130, at least one parallel reception data is received from the external semiconductor device by at least one of a plurality of data receiving groups of the pins. In step S140, the at least one parallel reception data is reorganized into the at least one input data and is provided to the at least one semiconductor components by the scalable digital interface circuit. Wherein, the sequence of steps S110, S120, S130 and S140 are for illustration, and the embodiment of the disclosure is not limited thereto. And the details of steps S110, S120, S130 and S140 can be shown with reference to the embodiments of FIG. 1 to FIG. 8, and will not be described again here.

In summary, the semiconductor device and the communication method between semiconductor devices of the embodiment of the disclosure, which transmits data through a large number of channels used for parallel transmission. At this time, the signal frequency can be further reduced to save interface power consumption, reduce interface circuit complexity and manufacturing costs. In addition, the actual transmission performance can be improved through massive parallel transmission, while achieving a low power consumption and high-performance data transmission interface. Moreover, since signals are transmitted between semiconductor devices through digital connections, the manufacturing process of semiconductor devices can be freely changed without affecting the connection method. Furthermore, the number of pins used to transmit signals between semiconductor devices does not need to be equal to increase the flexibility of mix-and-match transmission between semiconductor devices.

Although the disclosure has been disclosed as above with embodiments, it is not intended to limit the disclosure. Any person with ordinary knowledge in the art, without departing from the spirit and scope of the disclosure, can make some changes. Therefore, the protection scope of the disclosure shall be determined by the scope of the claims.

What is claimed is:

1. A semiconductor device, comprising:
   a plurality of pins, divided into a plurality of data sending groups and a plurality of data receiving groups;
   at least one semiconductor components, provide at least one output data and receive at least one input data;
   a scalable digital interface circuit, coupled to at least one of the data sending groups, at least one of the data receiving groups and the least one semiconductor components, wherein the scalable digital interface circuit reorganizes the at least one output data into at least one parallel transmission data to send the at least one parallel transmission data to an external semiconductor device by parallel transmission, and receives at least one parallel reception data from the external semiconductor device by parallel transmission to reorganize the at least one parallel reception data into the at least one input data; and
   a signal bus, coupled to the at least one semiconductor components and the scalable digital interface circuit.

2. The semiconductor device according to claim 1, wherein the at least one output data and the at least one input data respectively comprises at least one of an advanced high-performance bus signal, an advanced extensible interface signal, a serial bus signal, and a parallel bus signal.

3. The semiconductor device according to claim 1, wherein the connection number of the pins of the data sending groups and a plurality of data receiving pins of the external semiconductor device is in units of a pin base number for a single data sending group and is less than or equal to the smaller of the number of the pins of the data sending group and the number of the data receiving pins.

4. The semiconductor device according to claim 3, wherein when the sending speed of the pins of the data sending groups is higher than the transmission speed of the data sending groups, the higher the usage ratio of the connecting portion of the pins of the data sending groups and the data receiving pins of the external semiconductor device.

5. The semiconductor device according to claim 3, wherein when the transmission speed of the at least one output data and the at least one input data increases, the usage ratio of the connecting portion of the pins of the data sending groups and the data receiving pins of the external semiconductor device increases.

6. The semiconductor device according to claim 1, wherein the scalable digital interface circuit comprises:
   a bus package circuit, coupled to the signal bus;
   an address/data reassembly register, coupled to the bus package circuit;
   a sending reassembler, coupled to the address/data reassembly register;
   a receiving reassembler, coupled to the address/data reassembly register;
   a sending buffer, coupled to the sending reassembler;
   a receiving buffer, coupled to the receiving reassembler;
   a general-purpose input/output interface circuit, coupled to the sending buffer and the receiving buffer; and
   an input/output controller, coupled to the sending buffer and the receiving buffer, is configured to control the sending buffer and the receiving buffer,
   wherein when the bus package circuit receives the at least one output data from the at least one semiconductor components via the signal bus, the at least one output data is temporarily stored in the address/data reassembly register, then the sending reassembler reorganizes the at least one output data into the at least one parallel transmission data to temporarily store in the sending buffer, and the general-purpose input/output interface circuit sends the at least one parallel transmission data temporarily stored in the sending buffer to the external semiconductor device via at least one of the data sending groups; and
   when the general-purpose input/output interface circuit receives the at least one parallel reception data from the external semiconductor device via at least one of the data receiving groups, the at least one parallel reception data is temporarily stored in the receiving buffer, then the receiving reassembler reorganizes the at least one parallel reception data into the at least one input data to temporarily store in the address/data reassembly register, and the bus package circuit provides the at least one input data temporarily stored in the address/data reassembly register to the at least one semiconductor components via the signal bus.

7. The semiconductor device according to claim 6, wherein the general-purpose input/output interface circuit comprises:
   a plurality of general-purpose input/output transmission circuits, individually configured to receive one of at least one transmission data parts of the at least one parallel transmission data;
   a plurality of transmitting synchronization circuits, configured to send a sending synchronization signal and receive a receiving synchronization signal, wherein one of each of the transmitting synchronization circuits and the general-purpose input/output transmission circuits is coupled to a plurality of pins of the same data sending group in the data sending groups;
   a plurality of general-purpose input/output reception circuits, individually configured to receive one of at least one reception data parts of the at least one parallel reception data via the pins;
   a plurality of receiving synchronization circuits, configured to receive the sending synchronization signal and send the receiving synchronization signal, wherein one of each of the receiving synchronization circuits and the general-purpose input/output reception circuits is coupled to a plurality of pins of the same data receiving group in the data receiving groups;

a plurality of transmission multiplexers, individually has a first input end receiving a first transmission data part of the at least one transmission data parts from the sending buffer, a second input end receiving a second transmission data part adjacent to the first transmission data part of the at least one transmission data parts from the sending buffer, and an output end coupled to one of the general-purpose input/output transmission circuits; and a plurality of reception multiplexers, individually has a first input end coupled to a first general-purpose input/output reception circuit of the general-purpose input/output reception circuits, a second input end coupled to a second general-purpose input/output reception circuit adjacent to the first general-purpose input/output reception circuit of the general-purpose input/output reception circuits, and an output end providing the one of the at least one reception data parts.

8. The semiconductor device according to claim 7, further comprising a channel controller, coupled to the transmission multiplexers and the reception multiplexers, to control the output end of each of the transmission multiplexers to be coupled to one of the first input end and the second input end based on a channel test, and to control the output end of each of the reception multiplexers to be coupled to one of the first input end and the second input end.

9. The semiconductor device according to claim 1, wherein the semiconductor device and the external semiconductor device comprises a chip, and the at least one semiconductor components comprises at least one crystal grain.

10. A communication method between semiconductor devices, comprising:

reorganizing at least one output data provided by at least one semiconductor components into at least one parallel transmission data by a scalable digital interface circuit, wherein the at least one semiconductor components are coupled to the scalable digital interface circuit through a signal bus;

sending the at least one parallel transmission data to an external semiconductor device via parallel transmission by at least one of a plurality of data sending groups of a plurality of pins;

receiving at least one parallel reception data from the external semiconductor device by at least one of a plurality of data receiving groups of the pins; and reorganizing the at least one parallel reception data into the at least one input data and providing it to the at least one semiconductor components by the scalable digital interface circuit.

11. The communication method according to claim 10, wherein the at least one output data and the at least one input data respectively comprises at least one of an advanced high-performance bus signal, an advanced expandable interface signal, a serial bus signal, and a parallel bus signal.

12. The communication method according to claim 10, wherein the connection number of the pins of the data sending groups and a plurality of data receiving pins of the external semiconductor device is in units of a pin base number for a single data sending group and is less than or equal to the smaller of the number of the pins of the data sending group and the number of the data receiving pins.

13. The communication method according to claim 12, further comprising:

when a sending speed of the pins of the data sending groups is higher than a transmission speed of the data sending groups, a usage ratio of the connecting portion of the pins of the data sending groups and the data receiving pins of the external semiconductor device is higher.

14. The communication method according to claim 12, further comprising:

when a transmission speed of the at least one output data and the at least one input data increases, a usage ratio of the connecting portion of the pins of the data sending groups and the data receiving pins of the external semiconductor device increases.

15. The communication method according to claim 10, wherein the semiconductor device and the external semiconductor device comprises a chip, and the at least one semiconductor components comprises at least one crystal grain.

* * * * *